United States Patent
Daly et al.

(10) Patent No.: US 8,027,659 B1
(45) Date of Patent: Sep. 27, 2011

(54) CONFIGURATION OF ALERT MESSAGES FOR EMERGENCY ALERT SYSTEM BROADCAST

(75) Inventors: Brian Kevin Daly, Seattle, WA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1001 days.

(21) Appl. No.: 11/829,466

(22) Filed: Jul. 27, 2007

(51) Int. Cl.
*H04Q 7/20* (2006.01)
(52) U.S. Cl. .............................. 455/404.1; 455/404.2
(58) Field of Classification Search .............. 455/404.1, 455/404.2, 406, 412, 415, 435.1, 456.1, 457, 455/463, 531
See application file for complete search history.

(56) References Cited

U.S. PATENT DOCUMENTS

| | | | |
|---|---|---|---|
| 6,112,075 A | 8/2000 | Weiser | 455/404 |
| 7,471,732 B2* | 12/2008 | Tsatsanis | 375/267 |
| 2003/0050040 A1* | 3/2003 | Yamazaki et al. | 455/404 |
| 2006/0040639 A1 | 2/2006 | Karl et al. | 455/404.1 |
| 2008/0225848 A1* | 9/2008 | Pilon et al. | 370/390 |
| 2008/0291849 A1* | 11/2008 | Ostermeier et al. | 370/270 |

* cited by examiner

*Primary Examiner* — Dwayne Bost
*Assistant Examiner* — Myron Wyche
(74) *Attorney, Agent, or Firm* — Woodcock Washburn LLP

(57) ABSTRACT

An Emergency Alert System (EAS) alert message can be provided based on a configuration established by a subscriber of a mobile device as well as a characteristic of the mobile device. The subscriber can interact with an interface provided by the network provider to establish the configuration. Additionally, the mobile device can provide the characteristic such as the location of the mobile device to the network provider. The network provider can use the configuration established by the subscriber and/or the characteristic of the mobile device to determine which alert message to provide to the mobile device.

20 Claims, 7 Drawing Sheets

CONFIGURATION OF ALERT MESSAGES FOR EMERGENCY ALERT SYSTEM BROADCAST

TECHNICAL FIELD

The technical field generally relates to communications systems and more specifically relates to the broadcast of Emergency Alert System (EAS) messages. Even more specifically, the technical field relates to customizing which EAS messages are received by mobile devices.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. Currently, EAS alert messages are provided to a subscriber even if the subscriber would prefer not to receive particular messages. For example, AMBER alerts are provided to a subscriber even if the subscriber would prefer not to receive such messages. Additionally, EAS alert messages are provided to a subscriber with regard to one or more characteristics such as, for example, the location of the mobile device, the date of the mobile device, the time of the mobile device, or the like.

SUMMARY

Wireless Emergency Alert System (EAS) alert messages are provided to a mobile device based on characteristics of the mobile device and one or more configurations. For example, alert messages can be automatically and dynamically provided based on characteristics such as the location, date, time, or the like of the mobile device. Additionally, a subscriber of the mobile device can provide a configuration that includes the alert messages to be received by the mobile device.

BRIEF DESCRIPTION OF THE DRAWINGS

The foregoing and other objects, aspects and advantages of configuring EAS alert messages will be better understood from the following detailed description with reference to the drawings.

DETAILED DESCRIPTION OF ILLUSTRATIVE EMBODIMENTS

As will be described herein, Emergency Alert System (EAS) alert messages can be broadcast based on one or more configurations and characteristics. In an example embodiment, an EAS alert message can be provided, to a mobile device, based on a configuration established by a subscriber or user of the mobile device using an interface provided by a network provider to an electronic device and/or the mobile device. In another example embodiment, an EAS alert message can be provided dynamically and/or automatically, to a mobile device, based on a characteristic of the mobile device. Additionally, the alert can be received by the mobile device, but not presented to the subscriber or user based upon the subscriber or user defined configuration and/or characteristic of the mobile device according to another embodiment.

Figure 1:
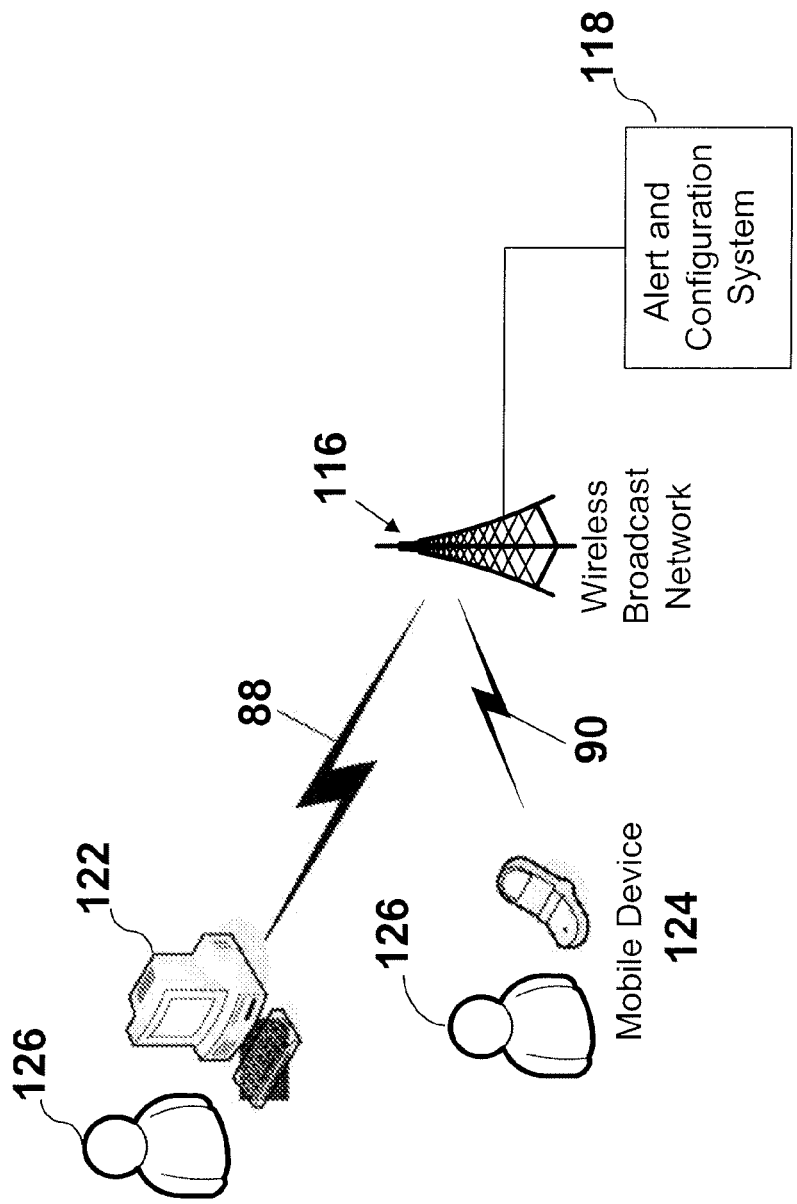
FIG. 1 is a flow diagram of an example system and process for receiving a configuration and a characteristic from a subscriber.

FIG. 1 is a flow diagram of an example system and process for receiving a configuration and a characteristic. In one embodiment, a configuration can be generated by a subscriber 126 using an electronic device 122. The electronic device 122 can include hardware components such as a processor, a graphics card, a storage component, a memory component, a memory card reader, an antenna, a communication port, a disc drive, or the like. The electronic device 122 can also include software components such as an operating system that can control the hardware components. The electronic device 122 can include any other suitable components such that subscriber can generate a configuration that includes alerts the subscriber elects to receive on his or her mobile device, for example. According to example embodiments, the electronic device can be a computer, a client system, a server, or the like.

At step 88, the configuration generated by the subscriber 126 can be provided, via the electronic device 122, to an alert and configuration system 118. The electronic device 122 can be connected to the alert and configuration system 118 by any wired or wireless technology including Internet connectivity, GSM, CDMA, WiFi, WiMAX, Bluetooth protocol, or the like. In accordance with one embodiment, the subscriber can use the electronic device 122 to generate a configuration that indicates the type of alert messages the subscriber elects to receive. The electronic device 122 can then communicate the configuration to the alert and configuration system 118.

The wireless broadcast network 116 can be any type of communication network including the example networks described below in FIGS. 5-7. For example, the wireless broadcast network 116 can include GSM, CDMA, WiFi, WiMax, EDGE, or the like Additionally, the wireless broadcast network 116 can be operated by a network provider. The network provider can offer bandwidth and/or network access to its subscribers to enable communication between subscribers and other users of electronic devices and/or mobile devices such as cellular phones, PDAs, PCs, Voice over Internet Protocol devices, analog telephone devices, or the like.

Additionally, the wireless broadcast network 116 can include the alert and configuration system 118. The alert and configuration system 118 can include any combination of hardware components such as processors, databases, storage drives, registers, cache, RAM memory chips, data buses, or the like and/or software components such as operating systems, database management applications, or the like. According to an example embodiment, the alert and configuration system 118 can be a network-based server that can provide an interface to subscribers to receive and/or modify configurations, can store such configurations, and/or can determine whether to provide one or more alert messages to specific mobile devices and the subscribers of such mobile devices.

In one embodiment, the alert and configuration system 118 can receive and store a configuration for each subscriber indicative of the types of alert messages the subscriber elects his or her mobile device to receive. The alert and configuration system 118 can use the configuration to determine whether to provide a broadcasted alert message received by the wireless broadcast network 116 from an emergency alert network 110, shown in FIG. 2, to a mobile device of the subscriber, which will be described in more detail below. Alternatively, any other suitable component of the wireless broadcast network 116 can be used to receive and store configurations for subscribers and determine whether to provide alert messages to subscribers based on such configurations. For example, the wireless broadcast network 116 can include a Home Location Register (HLR), Mobile Switching Center (MSC), or the like, which will be described in more detail below, that can be used to receive and store configurations for subscribers and determine whether to provide broadcasted alert messages to subscribers.

Additionally, at step 90, the configuration provided to the wireless broadcast network 116, defined at the electronic device 122 and maintained on the alert and configuration system 118, can be synchronized to the mobile device 124. For example, the mobile device 124 can include one or more storage modules that can receive and store the configuration locally. The synchronized configuration can be used locally by the mobile device 124 to determine whether the device is configured to receive, render, and/or output an alert message provided by the wireless broadcast network 116, at step 98, shown in FIG. 2, which will be described in more detail below.

According to another embodiment, a configuration can be generated by a subscriber 126 using the mobile device 124. The mobile device 124 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

At step 90, the configuration generated by the subscriber 126 can be provided, via the mobile device 124, to the wireless broadcast network 116. As described above, the wireless broadcast network 116 can store the configuration, provided at step 90, in an alert and configuration system 118. In an example embodiment, the alert and configuration system 118 can use the configuration to determine whether to transmit a broadcasted alert message to the mobile device 124. For example, the broadcasted alert message can include a message type packaged therewith. The message type can include information such a vector, a header, metadata, embedded data, or the like indicative of whether the broadcasted alert message is, for example, weather, child abduction (e.g., AMBER—America's Missing: Broadcast Emergency Response), government issued, geophysical e.g., landslide, meteorological (e.g., windstorm, tornado, hurricane, tsunami, lightning storms, thunderstorms, hurricanes, freezing rain, blizzards, fog), general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test, or the like. The alert and configuration system 118 can extract the message type from the alert message. The alert and configuration system 118 can compare the extracted message type of the alert message received, at step 96, shown in FIG. 2, with message types stored in the configuration. If the received message type matches at least one of the message types stored in the configuration, the wireless broadcast system 116 can provide, at step 98, shown in FIG. 2, the alert message to the mobile device 124, which will be described in more detail below. Additionally, in one embodiment, all transmitted alerts can be received by the mobile device 124 and the suppression of the alert to the subscriber or end user can be a mobile device function based upon the subscriber's or end user's configuration and/or a characteristic of the mobile device.

Figure 2:
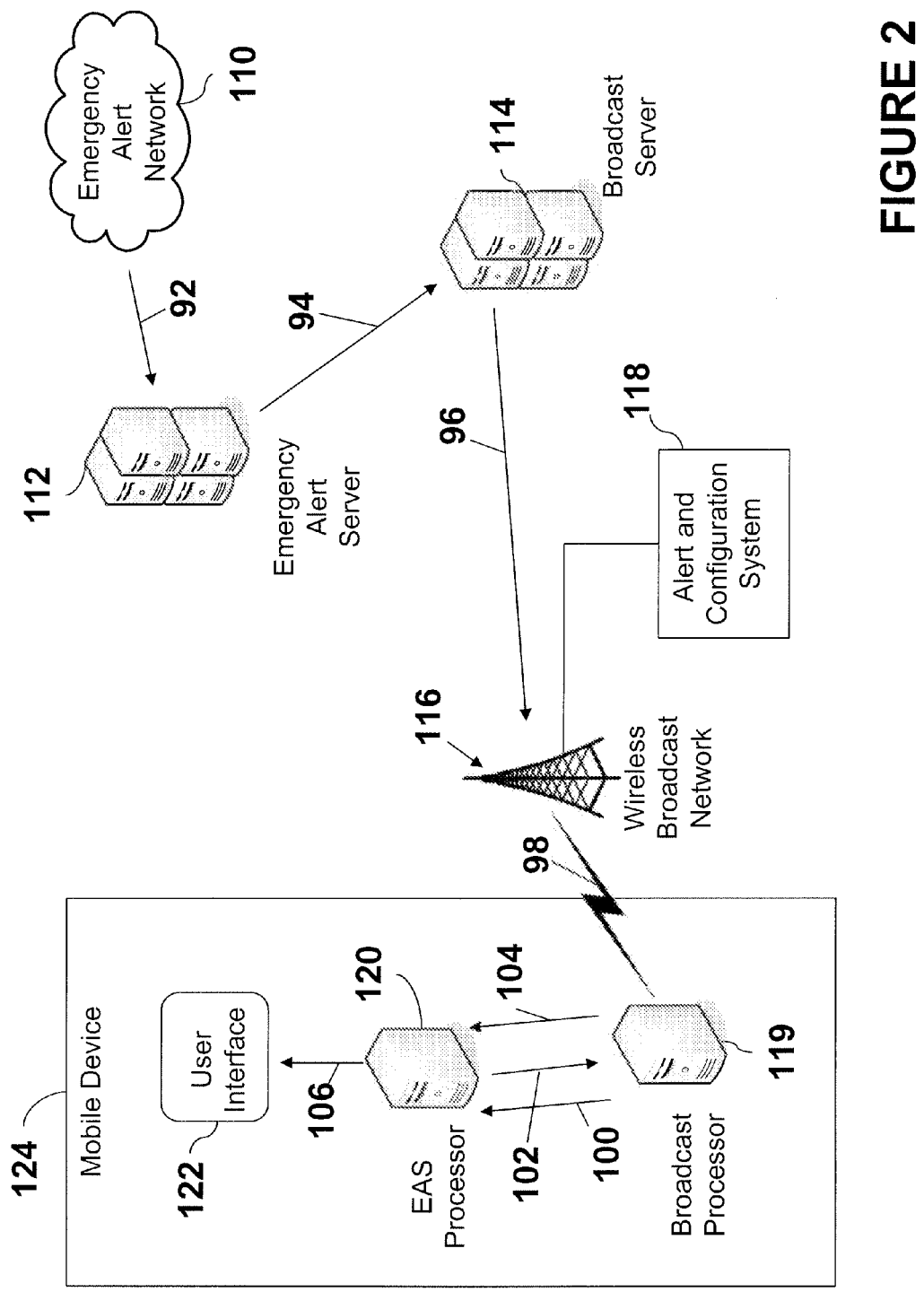
FIG. 2 is a flow diagram of an example system and process for providing alert messages to a mobile device.

FIG. 2 is a flow diagram of an example system and process for providing EAS alert messages. An EAS alert message is generated and provided, at step 92, via the emergency alert network 110, to the emergency alert server 112. In one embodiment, the emergency alert server 112 can analyze the received EAS alert message and can determine the type of message received. For example, the emergency alert server 112 can analyze and determine whether the received message includes a general alert type such as a weather alert, a natural disaster alert, a government alert, an AMBER alert, or the like. Additionally, the emergency alert server 112 can also analyze and determine whether the received message includes a specific alert type such as a weather, child abduction (e.g., AMBER—America's Missing: Broadcast Emergency Response), government issued, geophysical e.g., landslide, meteorological (e.g., windstorm, tornado, hurricane, tsunami, lightning storms, thunderstorms, hurricanes, freezing rain, blizzards, fog), general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test or the like. At step 94, the EAS alert message is provided by the emergency alert server 112 to the broadcast server 114.

At step 96, the broadcast server 114 provides the EAS alert message to the wireless broadcast network 116. Upon receipt of alert messages, the wireless broadcast network 116 can analyze the alert type and provide EAS alert messages to the mobile devices 124 based on at least one characteristic and/or configuration. For example, as described above, the wireless broadcast network can include an alert and configuration system 118 that can be used to determine whether alert messages received from the broadcast server 114, at step 96, should be provided to particular mobile devices. For example, in one embodiment, the alert and configuration system 118 can compare a characteristic such as the location, time, date of the mobile device and/or a configuration indicating the message types a subscriber elects to receive with the message type of the alert messages received, at step 96, to determine whether such messages should be broadcast to a mobile device of a particular subscriber, which will be described in more detail below.

At step 98, the wireless broadcast network 116 can broadcast the alert messages to the mobile device 124 based on the determination by the alert and configuration system 118. That is, according to one embodiment, the alert and configuration system 118 can determine which alert messages received by the wireless broadcast network 116, at step 96, correspond to the configuration and/or characteristics of the mobile device 124. The wireless broadcast network 116 can then broadcast alert messages corresponding to the configuration and/or characteristic to the mobile device 124.

Alternatively, at step 98, the wireless broadcast network 116 can broadcast to the mobile device 124 all alert messages received from the broadcast server 114, at step 96. The broadcast processor 119 of the mobile device 124 can receive the multiple alert messages (provided at step 98). In an example embodiment, the broadcast processor 119 can extract the message type from the received alert message and provide, at step 100, the message type to the EAS processor 120 on the mobile device 124. As described above, the alert message received by the broadcast processor 119 can include information indicating the type of alert message being received. For example, as described above, the alert message can include a message type embodied as a vector, metadata, a header, embedded data, or the like packaged therewith. The broadcast processor 119 can extract the vector, metadata, header, embedded data or the like and provide such information to the EAS processor, at step 100.

Using pre-provisioned subscriber preferences such as the configuration that can be stored in the mobile device 124 and/or characteristics of the mobile device 124, the EAS processor 120 can analyze the message type to determine if the emergency alert is of the type that the subscriber wishes to receive. If the subscriber wishes to receive this type of alert message, the EAS processor 120 provides, at step 102, to the broadcast processor 119 an indication that such a message type should be received. For example, if the subscriber's configuration indicates that the subscriber wishes to receive AMBER alerts, the EAS processor 120 will instruct, at step 102, the broadcast processor 119 to receive the alert message if the message is an AMBER alert message. Additionally, if a characteristic such as the location of the mobile device 124 indicates that the device is in an area prone to, for example, tornados, the EAS processor 120 can instruct, at step 102, the broadcast processor 119 to receive alert messages concerning tornado alerts. The EAS processor 120 can also instruct the broadcast processor 119 to block alert messages that are not of the message type stored in the configuration and/or that do not correspond to a characteristic of the mobile device.

Upon receipt from the EAS processor 120 of the indication of message types, the broadcast processor 119 obtains the alert message and provides, at step 104, the EAS alert message to the EAS processor 120. At step 106, the EAS processor 120 provides the received alert message, to the user interface 122. The user interface 122 can render the alert message and output the alert message in, for example, an audio format, a visual format, and/or any other suitable format to the subscriber.

The mobile device 124 is representative of any appropriate type of device that can be utilized to receive an alert message, store a configuration on the message types the subscriber wishes to receive on mobile device 124, and render and output the alert message in a suitable format to the subscriber. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

Each of the emergency alert server 112, the broadcast server 114, the mobile device 124, the electronic device 122, the broadcast processor 119, and the EAS processor 120 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. The EAS processor 120 and the broadcast processor 119 can be implemented as a single processor, separate processors, distributed processors, or a combination thereof. The emergency alert server 112 and the broadcast server 114 can be implemented as a single processor, separate processors, distributed processors, or a combination thereof.

Figure 3:
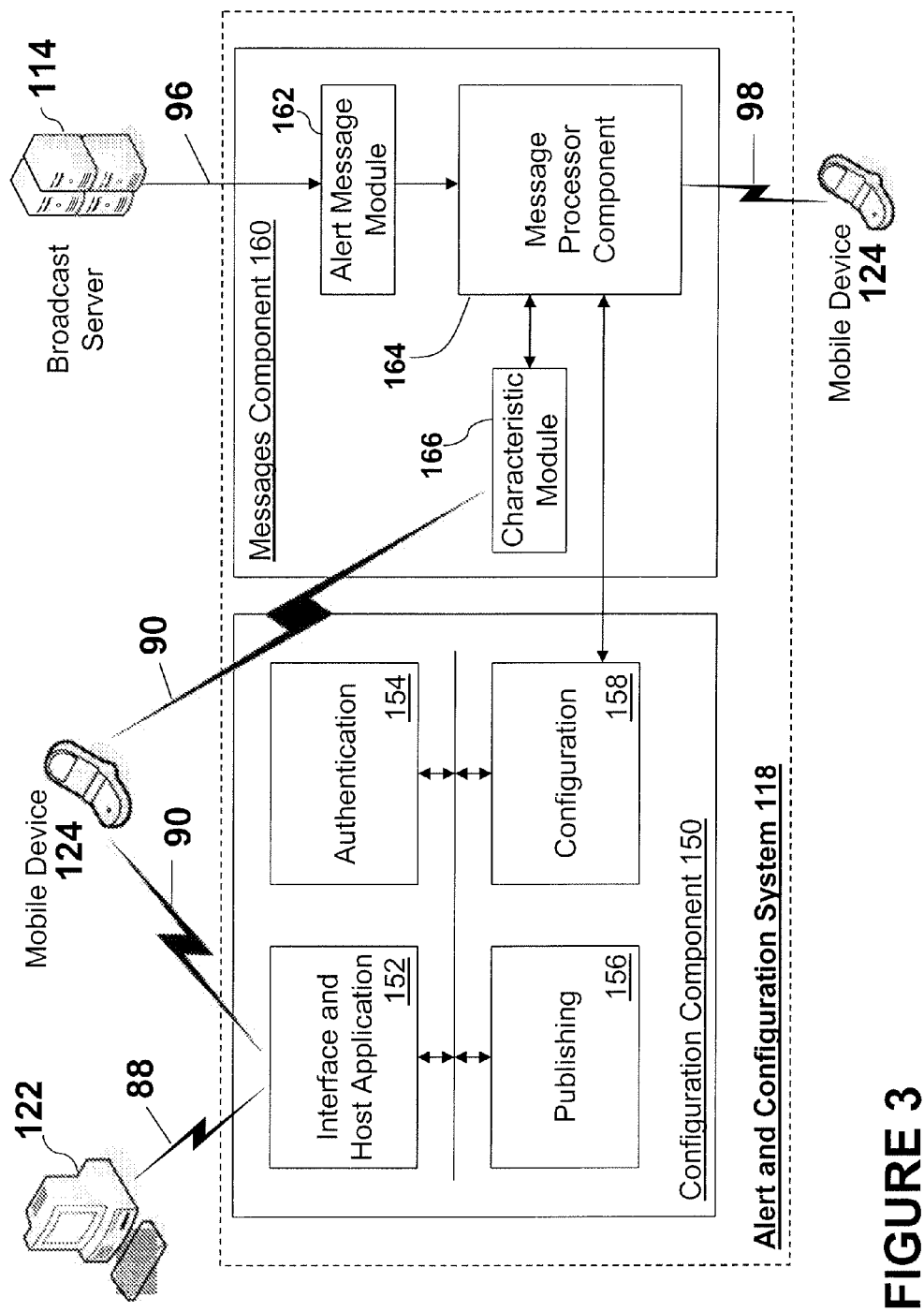
FIG. 3 depicts an example embodiment of an alert and configuration system for providing messages based on a characteristic and/or configuration.

FIG. 3 depicts an example embodiment of an alert and configuration system 118 for providing messages based on a characteristic and/or configuration. The alert and configuration system 118 can be implemented as an independent component that can be in operative communication with other components of the wireless broadcast network such as the MSC, the HLR, or the like described below in FIGS. 5-7. Alternatively, the alert and configuration system 118 can be implemented as a component within the MSC, the HLR, or the like as described below in FIGS. 5-7. For example, the alert and configuration system can be a feature added to HLR 774 depicted in FIG. 6. Thus, HLR 774 can receive and store a configuration for a subscriber and then can route that configuration to the alert and configuration component such that the alert and configuration system can determine which alert messages to provide to a subscriber. Additionally, the functionality of the alert and configuration system 118 can be performed by any suitable hardware and/or software or any combination thereof within HLR 774, for example.

Thus, according to example embodiments, the alert and configuration system 118 can be implemented using a variety of techniques and hardware components including, but not limited to, servers, databases, microchips, storage devices, processors, or programmed modules. Furthermore, as described above, the alert and configuration system 118 can be implemented as an independent component of the wireless broadcast network 116, as a separate component within existing components in the wireless broadcast network 116, and/or using existing components within the wireless broadcast network 116.

The alert and configuration system 118 can also include any combination of systems and sub-systems. According to one embodiment, the alert and configuration system 118 can include a configuration component 150 and a messages component 160 that can be in operative communication with the configuration component 150.

The configuration component 150 can include any number of systems and subsystems such as an interface and host application 152, an authentication module 154, a publishing module 156, and a configuration module 158. The interface and host application 152, authentication module 154, publishing module 156, and configuration module 158 can be in operative communication with each other via, for example a bus or any other subsystem that can transfer data between components such as the modules in the configuration component 150.

The interface and host application 152 of the configuration component 150 can interface with the electronic device 122 and/or the mobile device 124 to provide communication between, for example, the electronic device and various components and features of configuration component. The interface and host application 152 can include software components such as operating systems, Web-based management applications, or the like such that the interface and host application 152 can provide the overall infrastructure and can be the primary consumer of configurations, characteristics, or the like that can be stored by the configuration component 150. The interface and host application 152 can maintain its own processes, such as user management, and/or rules required to make intelligent use of the configurations, characteristics, or the like provided by the subscriber, electronic device, and/or mobile device. The interface and host application 152 can also serve to interact and interface with the other functional components of the configuration component 150 including the authentication module 154, publishing module 156, and configuration module 158.

Additionally, the interface and host application 152 can present a Web interface to the subscriber such as subscriber 126 via the electronic device 122 and/or the mobile device 124. For example, interface and host application 152 can provide an interface to handle the submission and modification of configurations generated by a subscriber such as subscriber 126 using the electronic device 122 and/or the mobile device 124. According to one embodiment, the interface and host application 152 can provide a user management function that can be responsible for maintaining the association of subscribers with configurations that can be provided by each of the subscribers. Thus, the interface and host application 152 can receive a request from a subscriber to create and/or modify a configuration and provide a display such as a Web page that can include alert message types and subtypes that can be selected by the subscriber to create and/or modify the configuration, according to an example embodiment.

The authentication module 154 can include any combination of hardware components such as processors, databases, storage drives, registers, cache, RAM memory chips, data buses, or the like and/or software components such that the authentication module 154 can provide a mechanism for authentication of a subscriber before a configuration can be provided by a subscriber and received by the alert and configuration system 118. Typically, subscribers such as subscriber 126 are authenticated by supplying a credential such as an account number, username, Personal Identification Number (PIN), password, or the like before access to the alert and configuration system 118 can be granted. Additionally, once a user has been authenticated, the alert and configuration system 118 and/or the configuration component 150 can cache the authentication status to prevent unnecessary external authentication requests, for example. The authentication module 154 can also verify whether the subscriber has a current configuration stored in the configuration component 150, for example.

The authentication module 154 can perform the authentication itself. Additionally, the authentication module 154 can delegate authentication authority to an authentication mechanism such as a Web-based authentication service. In one embodiment, the authentication module 154 can include bridges to various possible points of authentication such as the host application, the user's enterprise domain, or local cache of the alert and configuration system 118. Additionally, the passing of session-specific tokens, or other artifacts, to identify the context under which a subscriber can interact with the alert and configuration system 118 can be managed by the authentication module 154 in co-operation with the interface and host application 152, according to one embodiment.

The configuration component 150 can also include the publishing module 156. The publishing module 156 can include any combination of hardware components such as processors, databases, storage drives, registers, cache, RAM memory chips, data buses, or the like and/or software components. Processes internal to configuration component can use the publishing module 156 to manipulate, display, or manage data such as configurations that can be stored in the configuration component 150, for example. The publishing module 156 can be used to receive and deliver data for configurations including alert message types, or the like in a variety of ways including, but not limited to, Hypertext Transfer Protocol (HTTP) and/or Secure Hypertext Transfer Protocol (HTTP/S) for simple Web-based access, Simple Main Transfer Protocol (SMTP) for e-mail notifications of accounts and/or offers, Web Services/Simple Object Access Protocol (SOAP) for a programmatic way to access the data for accounts and/or offers, and Sharepoint for online review and collaboration of data for accounts and/or offers. For example, according to one embodiment, publishing module 156 can generate displays such as Web pages that can be delivered to the subscriber using the electronic device 122 and/or the mobile device 124 via HTTP through interface and host application 152. The subscriber can then interact with the display to create and/or modify a configuration corresponding to the types of alert messages that can be received by the mobile device 124.

According to one embodiment, the configuration component 150 can further include configuration module 158. Configuration module 158 can be adapted to store configurations corresponding to alert message types the mobile device 124 can be configured to receive. Additionally, configuration module 158 can be adapted to determine whether the mobile device 124 is eligible to received one or more alert messages based on a configuration stored therein. The configuration module 158 can include, for example, a database, RAM memory chips, cache, registers, hard drives, or any other suitable hardware components designed to store data such as the one or more configurations. According to one embodiment, the configurations that can be stored in the configuration module 158 can be indexed by the credential such as the account number, username, Personal Identification Number (PIN), password, or the like that can be provided by the subscriber to access the alert and configuration system 118. For example, the configuration module 158 can include a database that can include a list of configurations currently established for each subscriber. The configurations list can be implemented as a tree within the configuration module 158 such that the credential can be the root of the tree. Alternatively, the configurations list can be organized as hierarchy with the credential being the top of the hierarchy. Under each credential in the tree or hierarchy can be, for example, alert message types that a mobile device of a subscriber is configured to receive.

As described above with regard to FIG. 1, the subscriber can generate a configuration using the electronic device 122 and/or the mobile device 124. At step 88 and/or step 90, such a configuration can be provided to and received by the configuration component 150. For example, a display such as a web page can be generated using publishing module 156. Such a display can illustrate the alert message types that can be selected by a subscriber for his or her configuration as well as the subscriber's current configuration or alert message preferences including the alert message types the mobile device of the subscriber is configured to receive. The display can also be provided to the electronic device 122 and/or mobile device 124 through the interface and host application 152 such that the subscriber 126 can interact with the display and submit new and/or modified configurations.

In one embodiment, as described above, the alert and configuration system 118 can further include a messages component 160 that can be in operative communication with, for example, the configuration module 158 of the configuration component 150.

As shown in FIG. 3, the messages component 160 can include an alert message module 162. The alert message module 162 can store messages received from the emergency alert network. For example, the alert message module 162 can store the alert message provided to the wireless broadcast network 116, at step 96, from broadcast server 114. The alert message module can include, for example, RAM memory chips, registers, hard drives, or any suitable hardware designed to store data. Thus, alert message module 162 can be with the broadcast server 114 such that the alert message module 162 can receive and store alert messages including the alert type of each message provided by the broadcast server 114 at step 96, as described above. For example, alert message module 162 can receive and store alert messages and message types including, but not limited to, thunderstorm alerts, hurricane alerts, tenor alerts, volcano alerts, presidential alerts, forest fire alerts, and AMBER alerts.

The messages component 160 can further include characteristic module 166. According to one embodiment, characteristic module 166 can be adapted to store information for determining whether mobile device 124 includes a characteristic such as location, time, date, or the like that indicates the message type of the alert message provided, at step 96, is appropriate for receipt by the wireless device 124. For example, characteristic module 166 can include a database, RAM memory chips, registers, hard drives, or any suitable hardware designed to store data. Characteristic module 166 can receive and store one or more characteristics provided by the mobile device 124 at step 90, for example. According to one embodiment, characteristic module 166 can also be in operative communication with the HLR, the MSC, or any other components of the wireless broadcast network, as described below in FIGS. 5-7, such that the characteristic module 166 can be updated by the network provider with additional characteristics that can be used to determine whether to provide an alert message to the mobile device.

The messages component 160 can also include message processor component 164. Message processor component 164 can be in operative communication with alert message module 162, characteristic module 166, and configuration module 158, as shown in FIG. 3. The message processor component 164 can include, for example, a standard processor, a specialized processor, or the like. The message processor component 164 can engage in a message type analysis to determine whether to provide the alert message received, at step 96, to the mobile device 124. According to one embodiment, the message processor component 164 can extract a message type such as a vector, metadata, data, and/or information from the alert message received, at step 96, and stores the message type in the alert message module 162. The message processor component 164 can compare the message type stored in the alert message module 162 with the message types in the subscriber's configuration stored in the configuration module 158. If the message type of the alert message received, at step 106, matches at least one message type in the configuration, the message processor component 164 can provide the alert message received, at step 96, to the mobile device 124, at step 98.

Additionally, the message processor component 164 can compare a characteristic stored in the characteristic module 166 with information in the alert message such as the message type received, at step 106. In one embodiment, the mobile device 164 can provide the location of the mobile device, at step 90. The location can be received and stored by the characteristic module 166. The location can then be compared to information in the alert message to determine whether receipt of the alert message provided by the broadcast server 114, at step 106, is appropriate for receipt by the subscribe of mobile device 124. For example, the mobile device 124 may be located in Seattle, Wash. This characteristic can be provided to the characteristic module 166, at step 90. The message processor component 164 can compare this information with the alert message received at step 96. If the alert message received at step 96 is a suitable type to be received by a mobile device located in Seattle, Wash. such an alert message can be provided to the mobile device 124, at step 98. For example, if the alert message is a volcano eruption warning for Mount Saint Helens, the message can be provided to the mobile device 124, at step 98, based on the mobile device location. But, if the alert message received, at step 96, is not a suitable type to be received by a mobile device in Seattle, Wash. such an alert can not be provided to the mobile device, at step 98.

Figure 4:
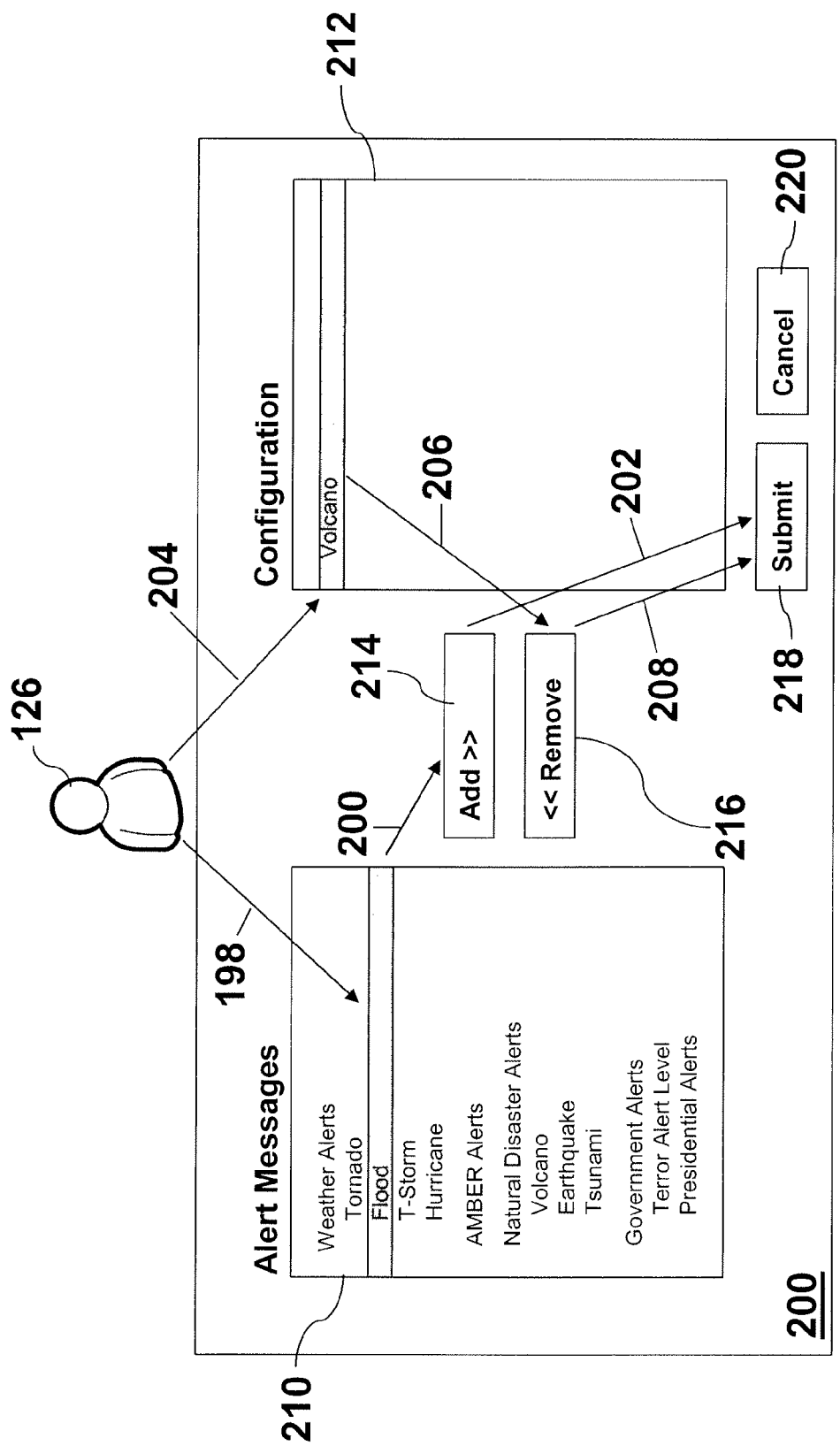
FIG. 4 depicts an example embodiment of an interface provided to establish a configuration for alert messages received by a mobile device.

FIG. 4 depicts an example embodiment of an interface 200 and a process of using the interface 200 to establish a configuration for alert messages received by a mobile device. As shown in FIG. 4, the interface 200 includes an alert message block 210 that indicates the general and specific types of alert messages that can be provided to the mobile device. The alert message block 210 can include general message types such as weather alerts, AMBER alerts, Natural Disaster Alerts, Government Alerts, or the like. Additionally, the alert messages block can include specific types of alert messages within a general type such weather alerts. For example, as shown in FIG. 4, the alert message block 210 can include specific types of alert messages such as tornado, flood, thunderstorms, hurricane within the general type, weather alerts.

The interface 200 can also include a configuration block 212. The configuration block 212 can include a list of alert types the subscriber currently receives. The list of alert types the subscriber currently receives as illustrated in the configuration block can be a default set of alert types provided by the network provider and/or a configuration previously generated by the subscriber.

According to one embodiment, a subscriber can interact with the alert messages block 210 to establish, create, and/or modify a configuration. At step 198, the subscriber 126 can select a general type in the alert messages block 210 to receive, for example, all alert messages within that general type. Additionally, the subscriber 126, at step 198, can select a specific type to receive only a specific type of message within the general type. For example, at step 198, the subscriber 126 can use an input device connected to an electronic device and/or the mobile device to highlight the general type or specific type of alert message for which the subscriber wishes to receive alert messages. At step 200, the subscriber 126 can then select an add button 214 to add the selected alert message type to the configuration block 212.

Additionally, at step 204, the subscriber 126 can select an alert type in his or her configuration that is displayed in a configuration block 212. At step 206, the subscriber 126 can click a remove button 216 to remove the alert type from his or her configuration. The subscriber 126 can interact with interface 200 to add additional alert types, as described above. Additionally, the subscriber can interact with interface 200 to remove default alert types that can be provided to a subscriber for his or her mobile device and/or alert types the subscriber previously received but no longer wants to receive. For example, the subscriber can use an input device connected to an electronic device and/or the mobile device to highlight the general type or specific type of alert message already in the configuration block 212. The subscriber 126 can then select the remove button 216 to remove the alert type and update a configuration illustrated in the configuration block 212.

Once the subscriber 126 has finished updating the configuration, the subscriber can select a submit button 218 on the interface 200, at step 202 and/or step 208. The configuration data can then be transmitted to, for example, the network provider. For example, at step 88 in FIG. 1, the configuration can be provided by the electronic 122 to wireless broadcast network 116 operated by the network provider after the submit button is selected at step 202 and/or step 208. As described above, the electronic device 122 can be connected to the alert and configuration system 118 by any wired or wireless technology including Internet connectivity, GSM, CDMA, WiFi, WiMAX, Bluetooth, or the like. Additionally, subscriber 126 can cancel creating and/or modifying a configuration by selecting a cancel button 220 on the interface 200.

Each subscriber can be required to receive alert messages of certain types such as presidential alert messages. Thus, a subscriber can not elect to remove those alert types in his or her configuration. The network provider can prevent those alert types from being updated by the subscriber by not displaying them via the interface. Alternatively, the network provider can display such alert types via the interface, but can lock such alert types from being removed.

The following description sets forth some exemplary telephony radio networks and non-limiting operating environments for broadcasting secure messages. The below-described operating environments should be considered non-exhaustive, however, and thus the below-described network architectures merely show how EAS alert messages may be incorporated into existing network structures and architectures. It can be appreciated, however, that EAS alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS alert messages can be applied independently of the method for data transport, and do not depend on any particular network architecture, or underlying protocols.

Figure 5:
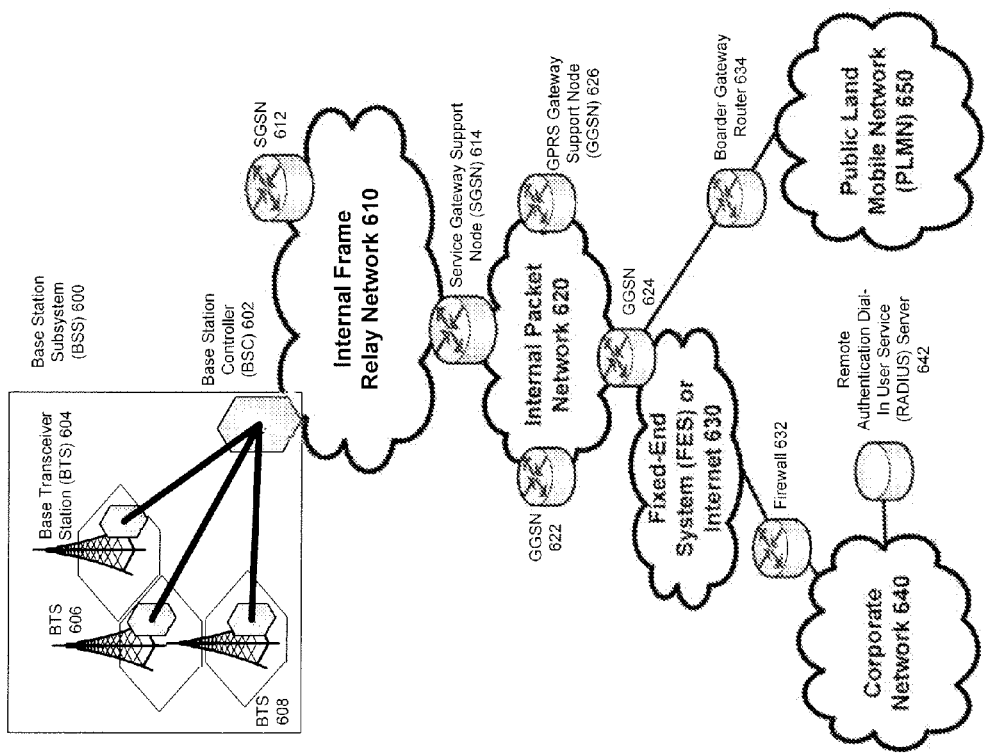
FIG. 5 depicts an overall block diagram of an exemplary packet-based mobile cellular network environment, such as a GPRS network, in which the system for providing alert messages based on a characteristic and/or configuration can be practiced.

FIG. 5 depicts an overall block diagram of an exemplary packet-based mobile cellular network environment, such as a GPRS network, in which the system for implementing a configuration based EAS alert message can be practiced. In an example configuration, the emergency alert network 110 and/or the wireless broadcast network 116 are encompassed by the network environment depicted in FIG. 5. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 6:
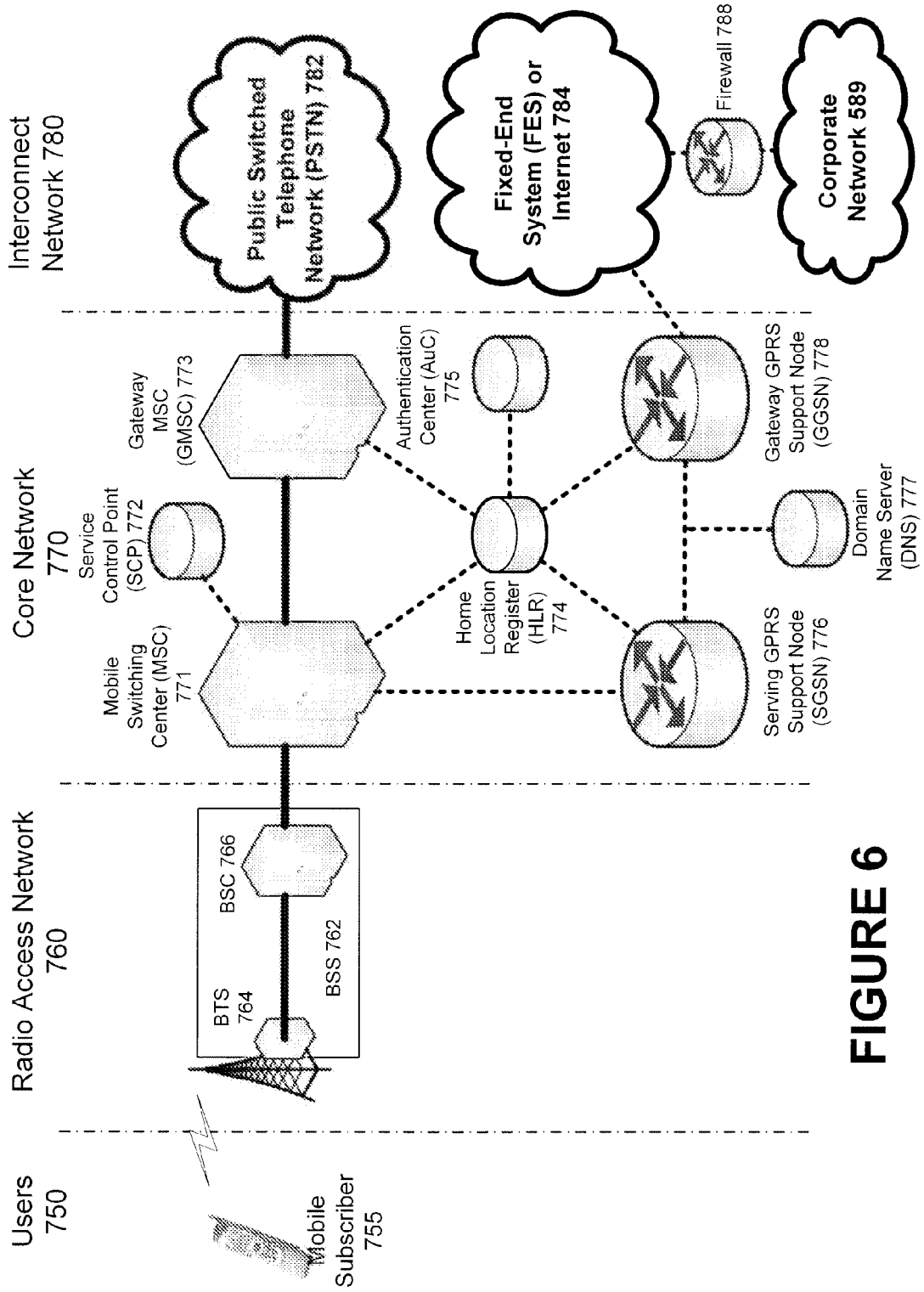
FIG. 6 illustrates an architecture of a typical GPRS network as segmented into four groups.

FIG. 6 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 6). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 124, used by an end user of the mobile cellular service. When a mobile subscriber turns on his or her mobile device, the mobile device goes through an attach process by which the mobile device attaches to an SGSN of the GPRS network. In FIG. 6, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of a configuration based EAS alert message can include but are not limited to Gateway GPRS Support Node tables, Fixed End System router tables, firewall systems, VPN tunnels, and any number of other network elements as required by the particular digital network.

Figure 7:
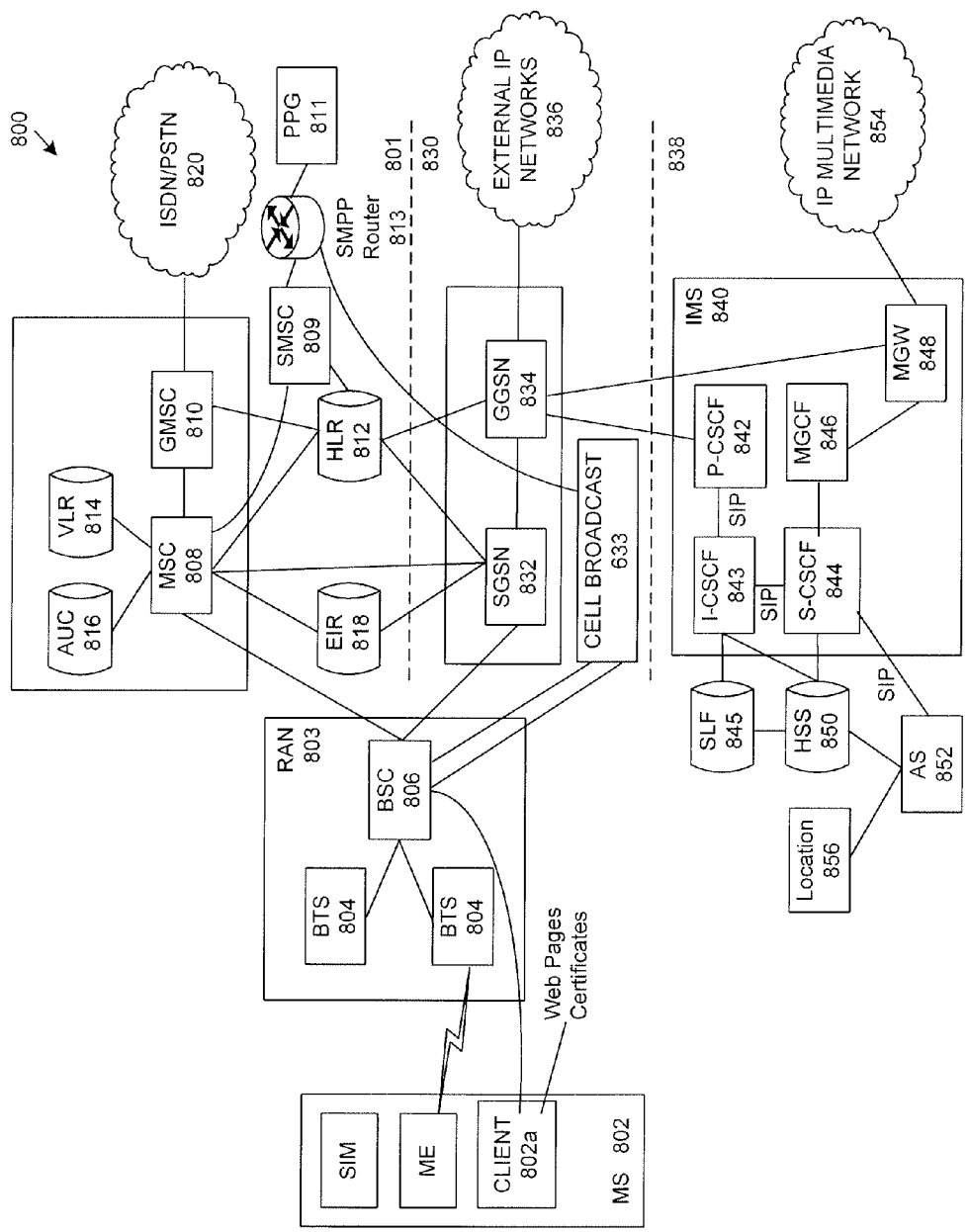
FIG. 7 illustrates an example alternate block diagram of an exemplary GSM/GPRS/IP multimedia network architecture in which alert messages based on a characteristic and/or configuration can be incorporated.

FIG. 7 illustrates another exemplary block diagram view of a GSM/GPRS/IP multimedia network architecture 800 in which a configuration based EAS alert message can be incorporated. As illustrated, architecture 800 of FIG. 7 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of establishing configurations and/or characteristics that can be used determine whether to broadcast EAS alert messages have been described in connection with various computing devices, the underlying concepts can be applied to any computing device or system capable of establishing configurations and/or characteristics that can be used determine whether to broadcast EAS alert messages. The various techniques described herein can be implemented in connection with hardware or software or, where appropriate, with a combination of both. Thus, the methods and apparatus of establishing configurations and/or characteristics that can be used determine whether to broadcast EAS alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing configurations and/or characteristics that can be used to filer EAS alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of establishing configurations and/or characteristics that can be used determine whether to broadcast EAS alert messages also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for establishing configurations and/or characteristics that can be used determine whether to broadcast EAS alert messages. When implemented on a general-purpose processor, the program code combines with the processor to provide a unique apparatus that operates to invoke the functionality of configurations and/or characteristics that can be used determine whether to broadcast EAS alert messages. Additionally, any storage techniques used in connection with an EAS alert message can invariably be a combination of hardware and software.

While establishing configurations and/or characteristics that can be used determine whether to broadcast EAS alert messages has been described in connection with the various embodiments of the various figures, it is to be understood that other similar embodiments can be used or modifications and additions can be made to the described embodiment for performing the same functions described herein. For example, one skilled in the art will recognize that a system of establishing configurations and/or characteristics that can be used determine whether to broadcast EAS alert messages as described may apply to any environment, whether wired or wireless, and may be applied to any number of devices connected via a communications network and interacting across the network.

What is claimed is:

1. A method of establishing a configuration that indicates the type of alert messages to be received by a mobile device generated by an emergency notification system the method comprising:
   receiving a credential of the mobile device and authenticating based on the credential to permit access;
   displaying a current configuration of alert messages to be received from the emergency notification system, if any, the mobile device is configured to receive corresponding to the received credential;
   receiving an updated configuration, wherein the updated configuration modifies the current configuration and indicates at least one alert message the mobile device is configured to receive from the emergency notification system; and
   storing the updated configuration.

2. A method in accordance with claim 1, wherein the current configuration and updated configuration include at least one elected message type indicating the type of alert messages the mobile device is configured to receive from the emergency notification system.

3. A method for sending an emergency alert to a mobile device configured to receive at least one elected message type from an emergency alert system comprising:
   receiving a broadcasted alert message from the emergency alert system;
   determining whether the broadcasted alert message corresponds to the at least one elected message type the mobile device is configured to receive; and
   providing, via wireless broadcast, the broadcasted alert message to the mobile device if the broadcasted alert message corresponds to the at least one elected message type the mobile device is configured to receive.

4. A method in accordance with claim 3, wherein the broadcast alert message comprises an Emergency Alert System alert message.

5. A method in accordance with claim 3, wherein the broadcasted alert message includes a broadcast alert message type.

6. A method in accordance with claim 5, wherein the broadcast message type and the elected message type includes at least one of the following: weather, child abduction, government issued, geophysical, meteorological, general emergency and public safety, law enforcement, military, homeland and local/private security, rescue and recovery, fire suppression and rescue, medical and public health, pollution, environmental conditions, public and private transportation, utility, telecommunication, other non-transport infrastructure, Chemical, Biological, Radiological, Nuclear or Explosive (CBRNE) threat or attack, and system test.

7. A method in accordance with claim 5, wherein determining whether the received alert message corresponds to the alert messages the mobile device is configured to receive based on an updated configuration from the mobile device comprises comparing the broadcast alert message type with the elected message type the device is configured to receive.

8. A method in accordance with claim 2, further comprising:
synchronizing the updated configuration with the mobile device; and
providing, via wireless broadcast, the broadcasted alert message to the mobile device, wherein the mobile device determines whether the broadcasted alert message corresponds to the elected message type the mobile device is configured to receive.

9. A system for determining alert messages to be received by a mobile device generated by an emergency alert system, the system comprising at least one processor configured to:
receive a characteristic from the mobile device wherein the characteristic indicates a feature of the mobile device;
select at least one alert message based on the received characteristic;
provide, via wireless broadcast, the selected alert message to the mobile device;
receive a configuration from the mobile device, wherein the configuration indicates one or more alert messages the mobile device is configured to receive; and
store the configuration.

10. The system in accordance with claim 9, wherein the at least one alert message comprises an Emergency Alert System alert message.

11. The system in accordance with claim 9, wherein the at least one alert message comprises a message type that includes at least one of the following: weather, child abduction, government issued, geophysical, meteorological, general emergency and public safety, law enforcement, military, homeland and local/private security, rescue and recovery, fire suppression and rescue, medical and public health, pollution, environmental conditions, public and private transportation, utility, telecommunication, other non-transport infrastructure, Chemical, Biological, Radiological, Nuclear or Explosive (CBRNE) threat or attack, and system test.

12. The system in accordance with claim 9, wherein the characteristic includes at least one of the following: location of the mobile device, date, and time.

13. The system in accordance with claim 9, wherein the at least one processor is configured to select the at least one alert message based on the received characteristic and the received configuration.

14. The system in accordance with claim 9, wherein the system comprises:
an alert messages module configured to store the broadcasted alert message;
a configuration module configured to store a configuration, wherein the configuration indicates one or more alert messages the mobile device is adapted to receive; in operative communication with an alert messages processor component;
a characteristic module adapted to store the characteristic received from the mobile device; and
an alert messages processor component in operative communication with the alert messages module, the configuration module, and the characteristic module, wherein the alert message processor component selects the at least one alert message based on the received characteristic stored in the characteristic module and the configuration stored in the configuration module.

15. A mobile device for determining alert messages to render to a subscriber, the mobile device configured to:
establish a configuration, wherein the configuration indicates one or more alert messages the mobile device is configured to receive from an emergency alert system;
receive a broadcasted alert message from a network provider of the mobile device;
determine whether to render the broadcasted alert message received from the network provider based on the established configuration; and
render the broadcasted alert message if the broadcasted alert message corresponds to the one or more alert message the mobile device is configured to receive based on the configuration.

16. The mobile device in accordance with claim 15, the mobile device further configured to establish a communication session with a network provider of the mobile device.

17. The mobile device in accordance with claim 15, wherein the mobile device is configured to determine whether to render the broadcasted alert message system by comparing the broadcast message type with the alert message types in the configuration.

18. The mobile device in accordance with claim 15, wherein the mobile device further comprises one or more characteristics stored therein.

19. The mobile device in accordance with claim 15, wherein the mobile device is configured to determine whether to render the broadcasted alert message based on the configuration and the characteristics.

20. The mobile device of claim 15, wherein the mobile device comprises:
a processor configured to receive the configuration and the broadcasted alert message; wherein the processor determines whether to render the broadcasted alert message received from the network based on the configuration; and
a user interface in operative communication with the processor, wherein the user interface renders the broadcasted alert message if the broadcasted alert message corresponds to the one or more alert message the mobile device is configured to receive based on the configuration.

\* \* \* \* \*